(12) United States Patent
Takeyama

(10) Patent No.: US 12,206,226 B2
(45) Date of Patent: Jan. 21, 2025

(54) CABLE STRIPPING TOOL

(71) Applicant: SUMITOMO ELECTRIC OPTIFRONTIER CO., LTD., Yokohama (JP)

(72) Inventor: Yoshihiro Takeyama, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 310 days.

(21) Appl. No.: 17/590,133

(22) Filed: Feb. 1, 2022

(65) Prior Publication Data

US 2022/0320838 A1    Oct. 6, 2022

(30) Foreign Application Priority Data

Apr. 1, 2021 (JP) ................................. 2021-062973

(51) Int. Cl.
*H02G 1/12* (2006.01)
(52) U.S. Cl.
CPC ................................ *H02G 1/1214* (2013.01)
(58) Field of Classification Search
CPC .... H02G 1/1214; H02G 1/1217; H02G 1/127; G02B 6/3898; H01R 43/015
See application file for complete search history.

(56) References Cited

U.S. PATENT DOCUMENTS

| 4,429,451 | A | * | 2/1984 | Angelico | H01R 43/015 |
|---|---|---|---|---|---|
| | | | | | 29/566.4 |
| 5,150,522 | A | * | 9/1992 | Gwo-Jiang | H02G 1/1224 |
| | | | | | 30/91.2 |
| 5,745,943 | A | * | 5/1998 | Bagley | H02G 1/1229 |
| | | | | | 7/107 |
| 5,924,200 | A | * | 7/1999 | College | H02G 1/127 |
| | | | | | 30/90.1 |
| 2018/0013253 | A1 | * | 1/2018 | Wang | H01R 43/0425 |

FOREIGN PATENT DOCUMENTS

| JP | H4-118708 | U | 10/1992 |
|---|---|---|---|
| JP | H07-59228 | A | 3/1995 |
| JP | H10-504173 | A | 4/1998 |
| JP | 2001-352634 | A | 12/2001 |
| JP | 2005-181704 | A | 7/2005 |

* cited by examiner

*Primary Examiner* — Hadi Shakeri
(74) *Attorney, Agent, or Firm* — Oliff PLC

(57) ABSTRACT

A cable stripping tool according to one embodiment is a cable stripping tool that strips a sheath of a cable. The cable stripping tool includes a blade protruding from an inner surface of a hole into which the cable is to be inserted. The sheath of the cable inserted into the hole is cut by the blade when the cable is pulled out from the hole along an extending direction of the cable. A cross-sectional shape of the hole is a non-circular shape in a plane orthogonal to the extending direction. The hole includes a space portion that a deformed portion of the cable inserted into the hole enters.

18 Claims, 10 Drawing Sheets

CABLE STRIPPING TOOL

TECHNICAL FIELD

The present disclosure relates to a cable stripping tool.

BACKGROUND

Japanese Unexamined Utility Model Publication No. H4-118708 discloses a cable stripper. The cable stripper includes a cylindrical grip portion in which an axial hole portion is formed. A cutout portion having a substantially U shape is formed on a lower side of the cylindrical grip portion. A roller holding portion including a round slicing portion and an axial arm portion is formed in the cutout portion. A roller is rotatably attached to an inner peripheral surface of the round slicing portion. A cutter attachment member is disposed inside the cylindrical grip portion. A cutter is attached to a tip portion of the cutter attachment member. An outer coating layer of a cable is cut along a longitudinal direction of the cable by inserting the cable between the roller and the cutter and by pulling the cylindrical grip portion in the longitudinal direction.

Japanese Unexamined Patent Publication No. 2001-352634 discloses a stripping tool for coated wires and a cutting tool for tube materials. The stripping tool includes a fixed holder that holds a coated wire, and a rotary holder including the cutter. The fixed holder includes a pair of clamp members that are provided to be openable and closable by a hinge. The clamp members have a pair of facing surfaces facing each other. Coated wire-accommodating grooves each having a perfect semi-circular cross section are formed in the facing surfaces. When the pair of clamp members are closed, the coated wire-accommodating grooves form a coated wire-holding portion having a perfect circular shape. The rotary holder is provided with a cutter accommodating portion to which a pair of the cutters are attached. A guide is accommodated in the cutter accommodating portion, together with the cutters. The coated wire is mounted in the rotary holder. The coated wire is regulated and deformed into a perfect circular shape in the immediate vicinity of the cutters by the guide.

Japanese Unexamined Patent Publication No. 2005-181704 discloses a stripping tool for drop cables. The stripping tool for drop cables includes a right separator body including a right handle, and a left separator body including a left handle. The right separator body and the left separator body are oscillatably connected to each other via a pivot shaft. A left fixed blade and a left movable blade are supported by the left separator body, and a right fixed blade and a right movable blade are supported by the right separator body. The left separator body and the right separator body oscillate in a state where a drop cable is disposed on the left fixed blade and on the right fixed blade, to strip a protective layer of the drop cable.

Japanese Unexamined Patent Publication No. H10-504173 discloses a method and a device for removing an insulating layer having a non-circular cross-sectional shape or for removing an insulating device of a cable. The device includes a casing and an insertion pipe passed through the casing. A horizontal cutter and a vertical cutter are disposed inside the insertion pipe. The horizontal cutter and the vertical cutter each cut an insulating layer of a cable inserted into the insertion pipe.

SUMMARY

A cable stripping tool according to one embodiment of the present disclosure is a cable stripping tool that strips a sheath of a cable. The cable stripping tool includes a blade protruding from an inner surface of a hole into which the cable is to be inserted. The sheath of the cable inserted into the hole is cut by the blade when the cable is pulled out from the hole along an extending direction of the cable. A cross-sectional shape of the hole is a non-circular shape in a plane orthogonal to the extending direction. The hole includes a space portion that a deformed portion of the cable inserted into the hole enters.

DETAILED DESCRIPTION

Figure 1:
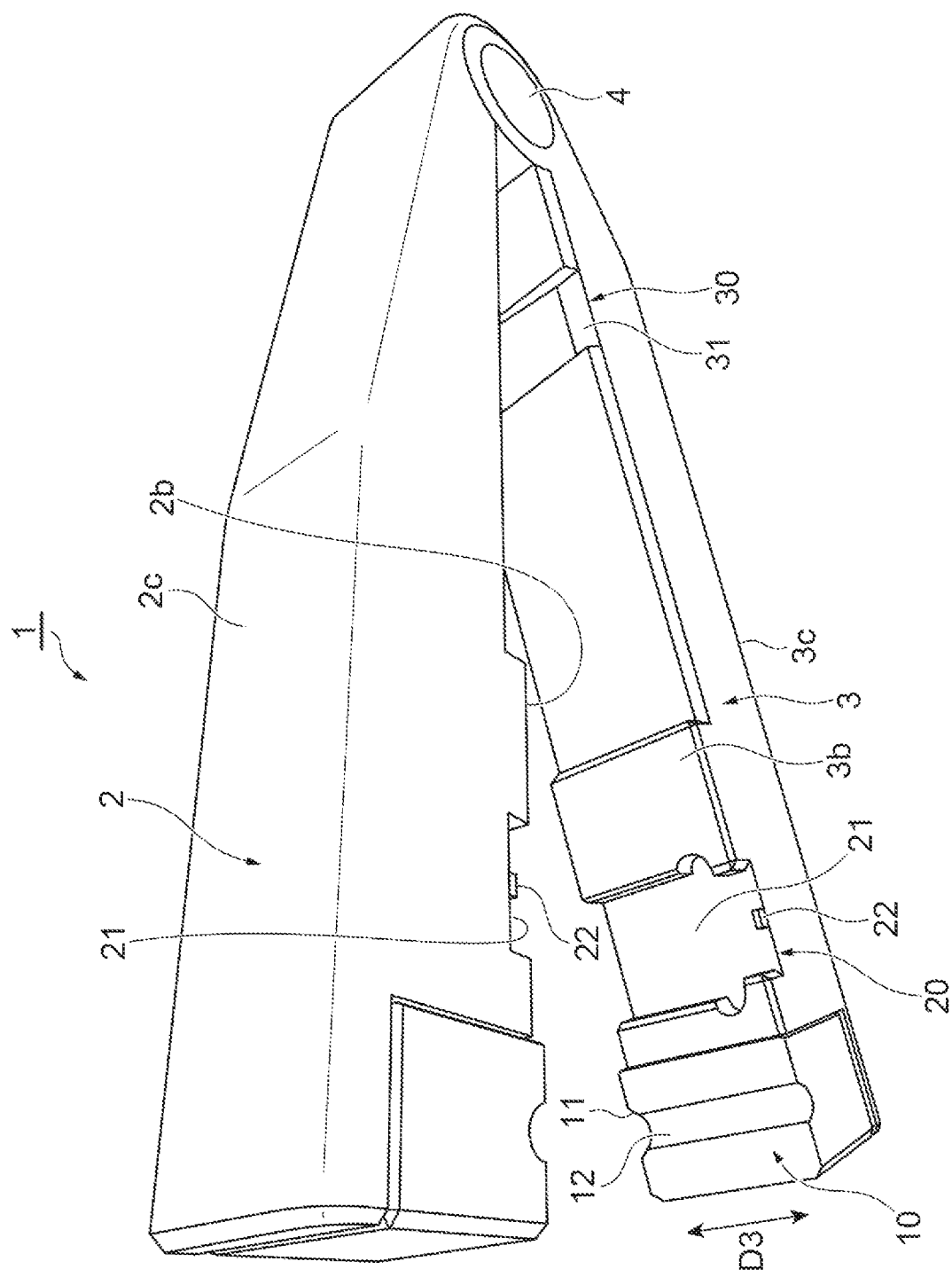
FIG. 1 is a perspective view illustrating a cable stripping tool according to an embodiment.

By the way, in a cable stripping tool in which a blade protrudes from an inner surface that defines a hole and which uses the blade to strip a sheath of a cable passed through the hole, it may be difficult for the cable to pass through the hole. The cable may be partially increased in diameter, for example, since the cable is wrapped with a seal. A portion of an increased diameter in the cable may be caught on the hole of the cable stripping tool. In this case, since the portion of an increased diameter in the cable cannot smoothly pass through the hole, it may occur that the portion of an increased diameter in the cable is not efficiently stripped.

An object of the present disclosure is to provide a cable stripping tool capable of efficiently striping a portion of an increased diameter in a cable.

According to the present disclosure, a portion of an increased diameter in a cable can be efficiently stripped.

Description of Embodiment of Present Disclosure

Initially, contents of an embodiment of the present disclosure will be listed and described. A cable stripping tool according to one embodiment of the present disclosure is a cable stripping tool that strips a sheath of a cable. The cable stripping tool includes a blade protruding from an inner surface of a hole into which the cable is to be inserted. The sheath of the cable inserted into the hole is cut by the blade when the cable is pulled out from the hole along an extending direction of the cable. A cross-sectional shape of the hole is a non-circular shape in a plane orthogonal to the extending direction. The hole includes a space portion that a deformed portion of the cable inserted into the hole enters.

In the cable stripping tool, a blade protrudes from an inner surface of a hole into which a cable is to be inserted. When the cable inserted into the hole is pulled out from the hole along an extending direction of the cable, the blade protruding from the inner surface of the hole cuts a sheath of the cable along the extending direction. Therefore, the sheath of the cable can be cut along the extending direction of the cable. A cross-sectional shape of the hole is a non-circular shape in a plane orthogonal to the extending direction of the cable. The hole having a non-circular shape includes a space portion that a deformed portion of the cable enters. Therefore, when a portion of an increased diameter in the cable is passed through the hole and the cable is pressed against the inner surface of the hole, the deformed portion of the cable can enter the space portion of the hole. Consequently, when the portion of an increased diameter in the cable is passed through the hole and the portion is pressed, the deformed portion created by the pressing can escape to the space portion. Therefore, the portion of an increased diameter in the cable can be prevented from being caught on the hole, to allow the portion of an increased diameter to smoothly pass through the hole. As a result, the portion of an increased diameter in the cable can be efficiently stripped.

An inclined surface that is gradually reduced in diameter toward the hole may be formed in an end portion of the hole in an extending direction. In this case, an inclined surface that is gradually reduced in diameter toward the hole is formed in an end portion of the hole in an extending direction. Therefore, the portion of an increased diameter in the cable can be smoothly inserted into the hole via the inclined surface that is more increased in diameter than the hole, so that the portion of an increased diameter in the cable can be efficiently stripped by the blade.

The cross-sectional shape of the hole may be an elliptical shape in a plane orthogonal to the extending direction. In this case, the cross-sectional shape of the hole through which the portion of an increased diameter in the cable is passed can be made simpler.

The blade may protrude to the inside of the hole from an inner surface portion of the hole which has a minimum distance from a center of the hole in the cross-sectional shape of the hole. In this case, since the blade protrudes from the inner surface portion of the hole which presses the portion of an increased diameter in the cable, the blade can easily bite into the pressed portion of the cable. Therefore, the sheath can be more efficiently stripped by the blade.

A connector may be attached to one end of the cable via a boot. The cable stripping tool may further include a connector disassembling portion that removes the connector from the cable, and a boot disassembling portion that disassembles the boot. In this case, the sheath can be stripped, the connector can be disassembled, and the boot can be additionally disassembled by one cable stripping tool. Therefore, the stripping of the sheath, and the removal of the connector and of the boot can be performed by one tool, so that work of disassembling the cable can be efficiently performed.

Details of Embodiment of Present Disclosure

Hereinafter, a specific example of the cable stripping tool according to the present disclosure will be described with reference to the drawings. Incidentally, the present disclosure is not limited to the following specific example. In the description of the drawings, the same or equivalent components are denoted by the same reference signs, a duplicated description will be appropriately omitted. The drawings may be depicted in a partially simplified or exaggerated manner for the ease of understanding, and dimensional ratios and the like are not limited to those disclosed in the drawings.

FIG. 1 is a perspective view illustrating a cable stripping tool 1 according to an embodiment. As illustrated in FIG. 1, the cable stripping tool 1 includes, for example, a first extending portion 2, a second extending portion 3, and a hinge portion 4 that oscillatably connects the first extending portion 2 and the second extending portion 3. For example, the cable stripping tool 1 is formed by cutting metal. As one example, the cable stripping tool 1 is made of an aluminum alloy. In this case, the cost of the cable stripping tool 1 can be suppressed, and the weight of the cable stripping tool 1 can be reduced. For example, the first extending portion 2 and the second extending portion 3 each extend linearly from the hinge portion 4. The cable stripping tool 1 includes a cable stripping portion 10, a connector disassembling portion 20, and a boot disassembling portion 30 between the first extending portion 2 and the second extending portion 3.

The first extending portion 2 has a first facing surface 2b facing the second extending portion 3, and a first gripping surface 2c facing a side opposite the first facing surface 2b. The second extending portion 3 has a second facing surface 3b facing the first extending portion 2, and a second gripping surface 3c facing a side opposite the second facing surface 3b. A distance between the first facing surface 2b and the second facing surface 3b can be reduced, for example, by holding the first gripping surface 2c and the second gripping surface 3c with a hand and by gripping the first extending portion 2 and the second extending portion 3.

The cable stripping portion 10, the connector disassembling portion 20, and the boot disassembling portion 30 are provided in the first facing surface 2b and in the second facing surface 3b. Accordingly, the stripping of a cable C, the disassembly of a connector, and the disassembly of a boot are performed by gripping the first gripping surface 2c and the second gripping surface 3c. The cable stripping portion 10, the connector disassembling portion 20, and the boot disassembling portion 30 are disposed side by side in order. As one example, the boot disassembling portion 30 is disposed at a position adjacent to the hinge portion 4. The connector disassembling portion 20 is disposed between the boot disassembling portion 30 and the cable stripping portion 10. The cable stripping portion 10 is disposed opposite the hinge portion 4 with respect to the connector disassembling portion 20.

Figure 2:
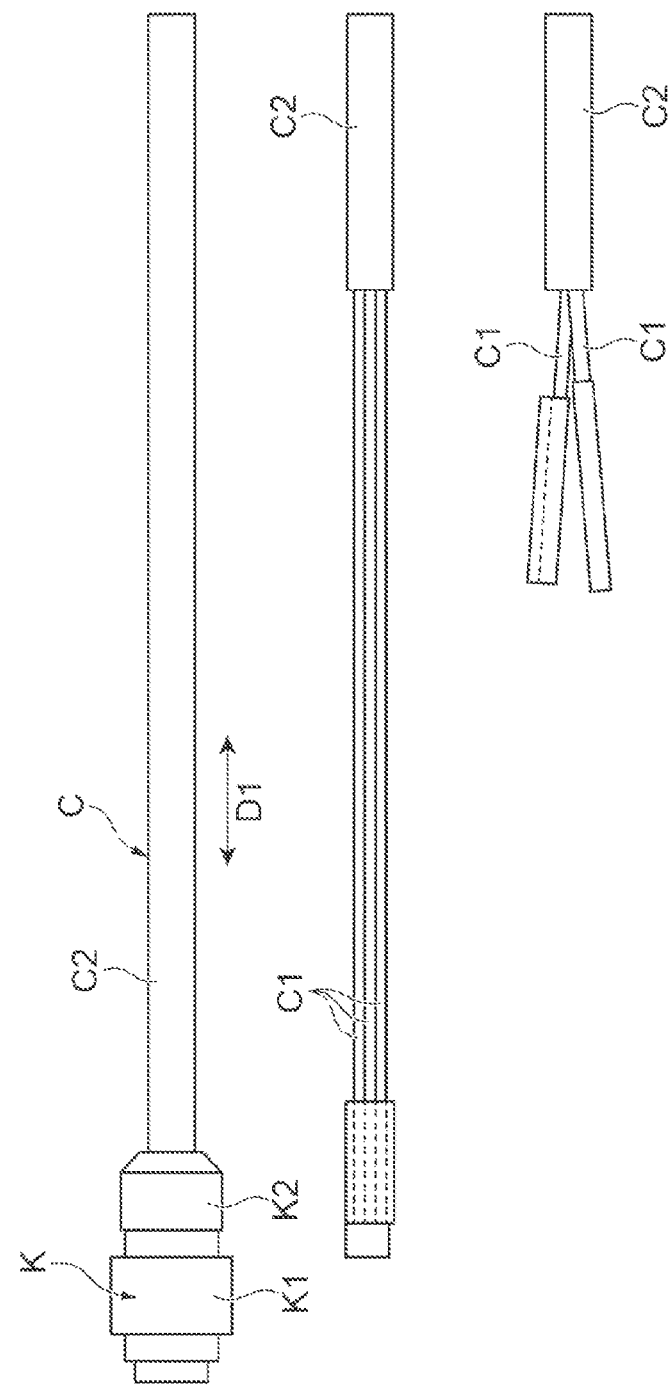
FIG. 2 is a view illustrating an example of a step of stripping a cable.

FIG. 2 schematically illustrates the cable C for which the cable stripping tool 1 is used. For example, a connector K is attached to an end portion of the cable C. The connector K is, as one example, an MPO connector. The connector K includes, for example, a housing K1 and a boot K2 connected to the housing K1. The boot K2 and the cable C are connected to the housing K1. The cable stripping tool 1 according to the present embodiment can disassemble the connector K from the cable C. As a specific example, the connector K connected to the cable C is disassembled from the cable C, and a sheath C2 of the cable C is peeled off along a direction D1 that is an extending direction of the cable C. A portion (ribbonized portion) is left in which core wires C1 located inside the sheath C2 are bundled. As one example, the cable C is a cord having an outer diameter (diameter) of 3 mm.

Figure 3:
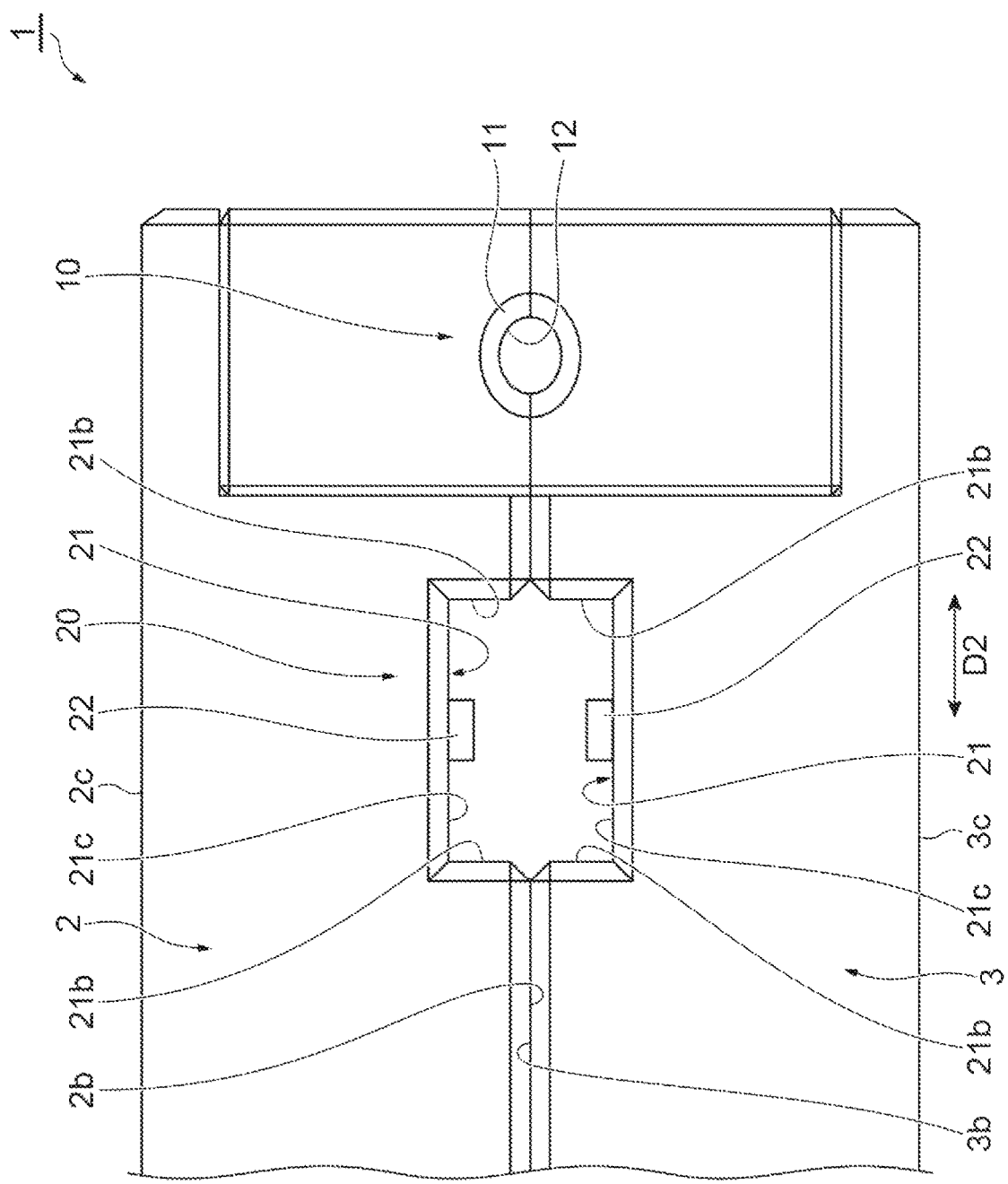
FIG. 3 is a side view illustrating a cable stripping portion and a connector disassembling portion of the cable stripping tool in FIG. 1.

FIG. 3 is a side view of the cable stripping tool 1 illustrating the cable stripping portion 10 and the connector disassembling portion 20 of the cable stripping tool 1. As illustrated in FIGS. 1 to 3, the cable stripping portion 10 and the connector disassembling portion 20 are arranged along a direction D2 that is an extending direction of the first extending portion 2 and of the second extending portion 3. The cable stripping portion 10 is a portion that peels off the sheath C2 of the cable C along the direction D1. The connector disassembling portion 20 is a portion that removes the housing K1 of the connector K from the cable C. The cable stripping portion 10 has an inclined surface 11 formed in an insertion portion into which the cable C is to be inserted, and a hole 12 extending from the inclined surface 11 to the inside of the cable stripping tool 1. The cable C is inserted into the hole 12 along a direction D3 that is an extending direction of the hole 12.

Figure 4:
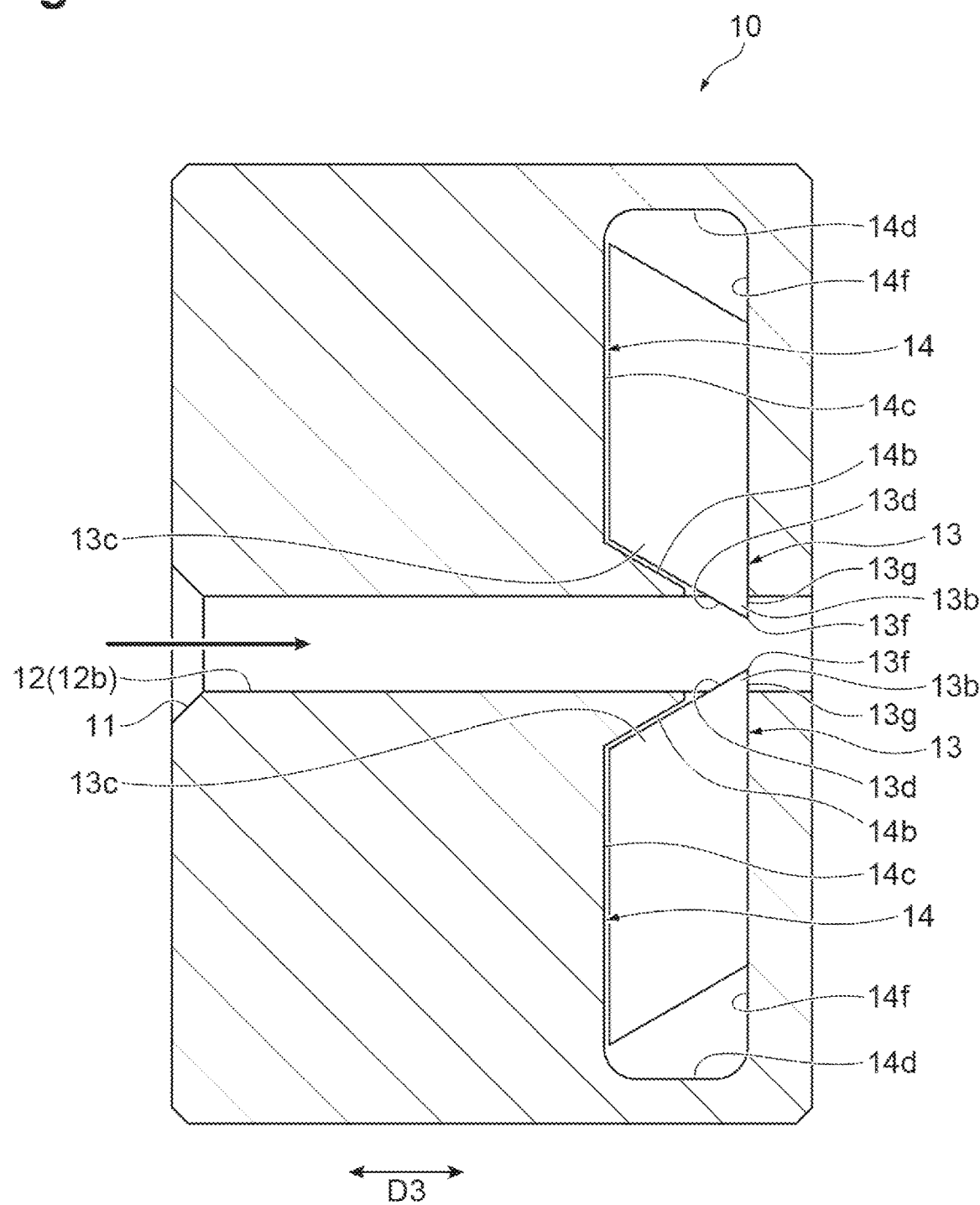
FIG. 4 is a cross-sectional view illustrating a blade of the cable stripping tool in FIG. 1 and a holding portion that holds the blade.

FIG. 4 is a cross-sectional view of the cable stripping portion 10 when the cable stripping portion 10 is taken along a plane orthogonal to the direction D2. As illustrated in FIGS. 1 and 4, the inclined surface 11 is located at one end of the hole 12 in the direction D3. The inclined surface 11 is gradually reduced in diameter toward the hole 12. As one example, the inclined surface 11 is formed by C chamfering. For example, the inclined surface 11 has a flat shape at a cross section. The hole 12 has, for example, an elliptical cylindrical hole shape. A shape of an inner surface 12$b$ that defines the hole 12 is an elliptical cylindrical shape.

The cable stripping portion 10 includes a blade 13 protruding to the inside of the hole 12, and a holding portion 14 that holds the blade 13. The blade 13 includes, for example, a cutting portion 13$b$ that cuts the sheath C2 of the cable C, and a held portion 13$c$ to be held by the holding portion 14. The cutting portion 13$b$ protrudes from the inner surface 12$b$ of the hole 12. The cutting portion 13$b$ includes an inclined portion 13$d$ that is inclined with respect to the direction D3; a tip 13$f$ of the inclined portion 13$d$ that is located opposite the held portion 13$c$; and an extending portion 13$g$ extending from the tip 13$f$ to the outside of the hole 12. The cable C inserted into the hole 12 enters the inclined portion 13$d$. In this state, the blade 13 cuts the sheath C2 of the cable C along the direction D3.

The holding portion 14 has, for example, a recessed shape. The blade 13 can be fitted into the holding portion 14. The holding portion 14 holds the blade 13 that is fitted. The holding portion 14 includes an inclined portion 14$b$ extending from the inner surface 12$b$ of the hole 12 along the inclined portion 13$d$; and a first extending portion 14$c$ extending from an end portion of the inclined portion 14$b$ opposite the inner surface 12$b$ in a direction intersecting the direction D3. The holding portion 14 includes a second extending portion 14$d$ extending from an end portion of the first extending portion 14$c$ opposite the inclined portion 14$b$ along the direction D3; and a third extending portion 14$f$ extending from the extending portion 13$g$ to the second extending portion 14$d$. The blade 13 has, as one example, a parallelogram shape. The blade 13 is held by the holding portion 14 such that the cutting portion 13$b$ protrudes from the hole 12. As one example, the cable stripping portion 10 includes a pair of the blades 13. The hole 12 is formed between the pair of blades 13. Accordingly, the sheath C2 of the cable C inserted into the hole 12 can be cut by the pair of the blades 13, and longitudinal peeling of the sheath C2 along the direction D3 can be performed.

Figure 5:
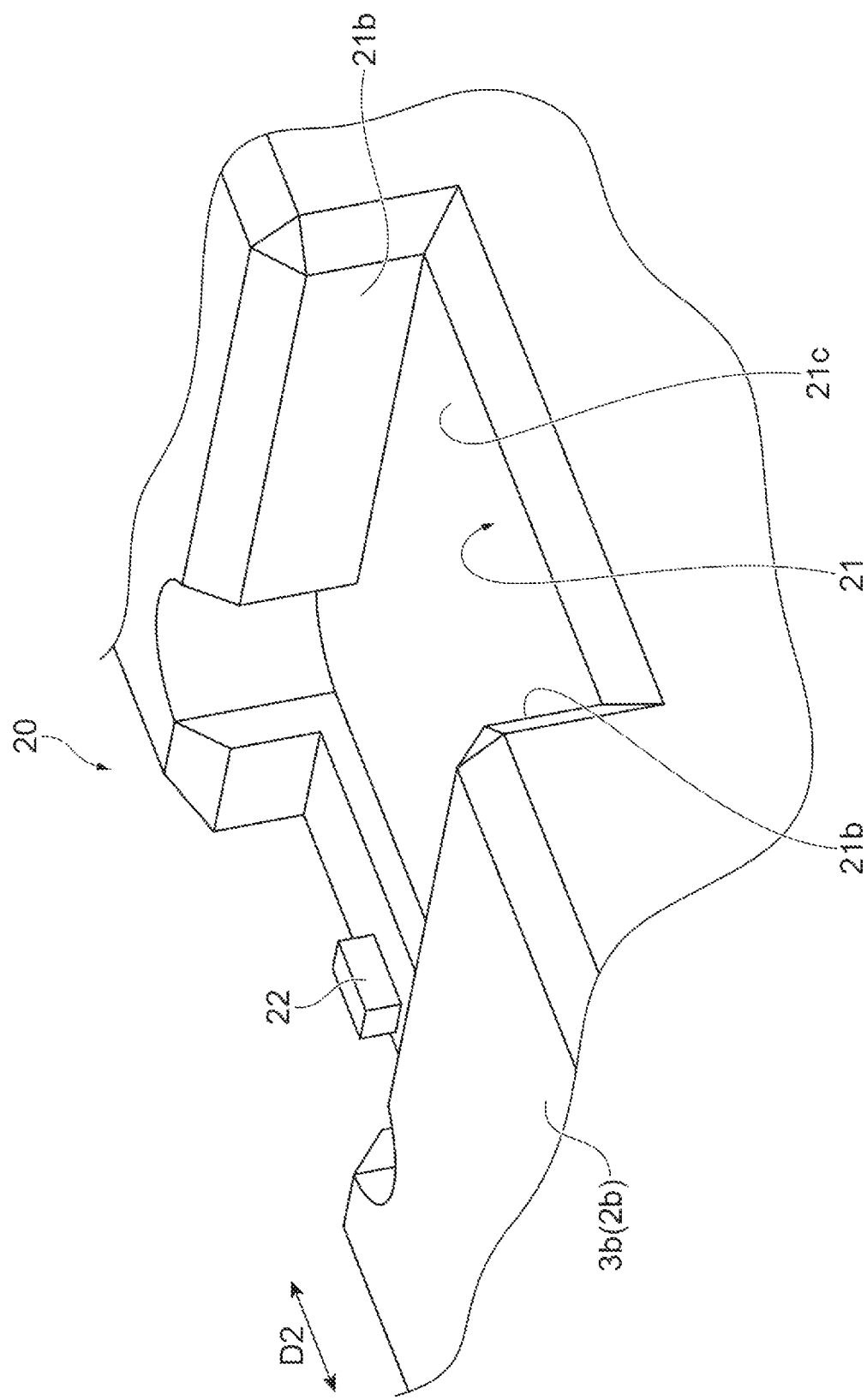
FIG. 5 is a perspective view illustrating a state where the connector disassembling portion in FIG. 3 is opened.

FIG. 5 is a perspective view illustrating the connector disassembling portion 20. As illustrated in FIGS. 3 and 5, the connector disassembling portion 20 includes a recessed portion 21 that is recessed from each of the first facing portion 2$b$ and the second facing surface 3$b$, and a protrusion portion 22 formed in the recessed portion 21. The recessed portion 21 is defined by a pair of side surfaces 21$b$ arranged along the direction D2, and by a bottom surface 21$c$ extending in the direction D2 between the pair of side surfaces 21$b$. The protrusion portion 22 protrudes from, for example, the bottom surface 21$c$. The protrusion portion 22 is a portion that enters the housing K1 of the connector K. The protrusion portion 22 can enter the housing K1 to remove the housing K1 from the cable C. The protrusion portion 22 corresponds to a portion that enters the housing K1 of the connector K to remove the housing K1 from the cable C.

Figure 6:
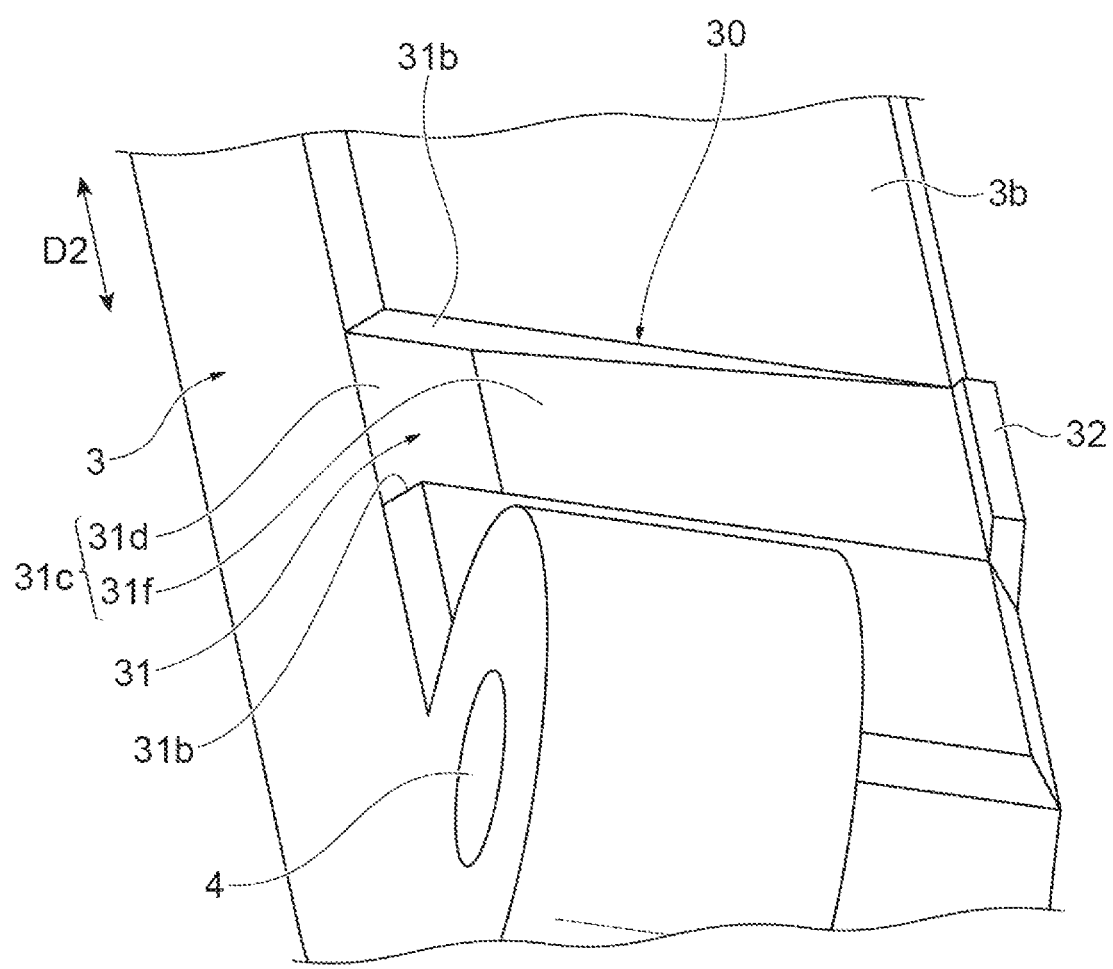
FIG. 6 is a perspective view illustrating a boot disassembling portion of the cable stripping tool in FIG. 1.

FIG. 6 is a perspective view illustrating the boot disassembling portion 30. The boot disassembling portion 30 includes a recessed portion 31 that is recessed with respect to the second facing surface 3$b$ of the second extending portion 3, and a protrusion portion 32 protruding from the second facing surface 3$b$. The recessed portion 31 is defined by a pair of side surfaces 31$b$ arranged along the direction D2, and by a bottom surface 31$c$ located between the pair of side surfaces 31$b$. The bottom surface 31$c$ includes a bottom portion 31$d$ located at an end portion opposite the protrusion portion 32, and an inclined portion 31$f$ extending from the bottom portion 31$d$ to the protrusion portion 32.

The protrusion portion 32 protrudes from an end portion of the inclined portion 31$f$ opposite the bottom portion 31$d$. As one example, the protrusion portion 32 has a rectangular shape. The protrusion portion 32 corresponds to a portion that crushes the boot K2 interposed between the first gripping surface 2$c$ and the second gripping surface 3$c$. When the protrusion portion 32 bites into the boot K2 interposed between the first extending portion 2 and the second extending portion 3, the boot K2 is crushed and the boot K2 is disassembled.

Figure 7:
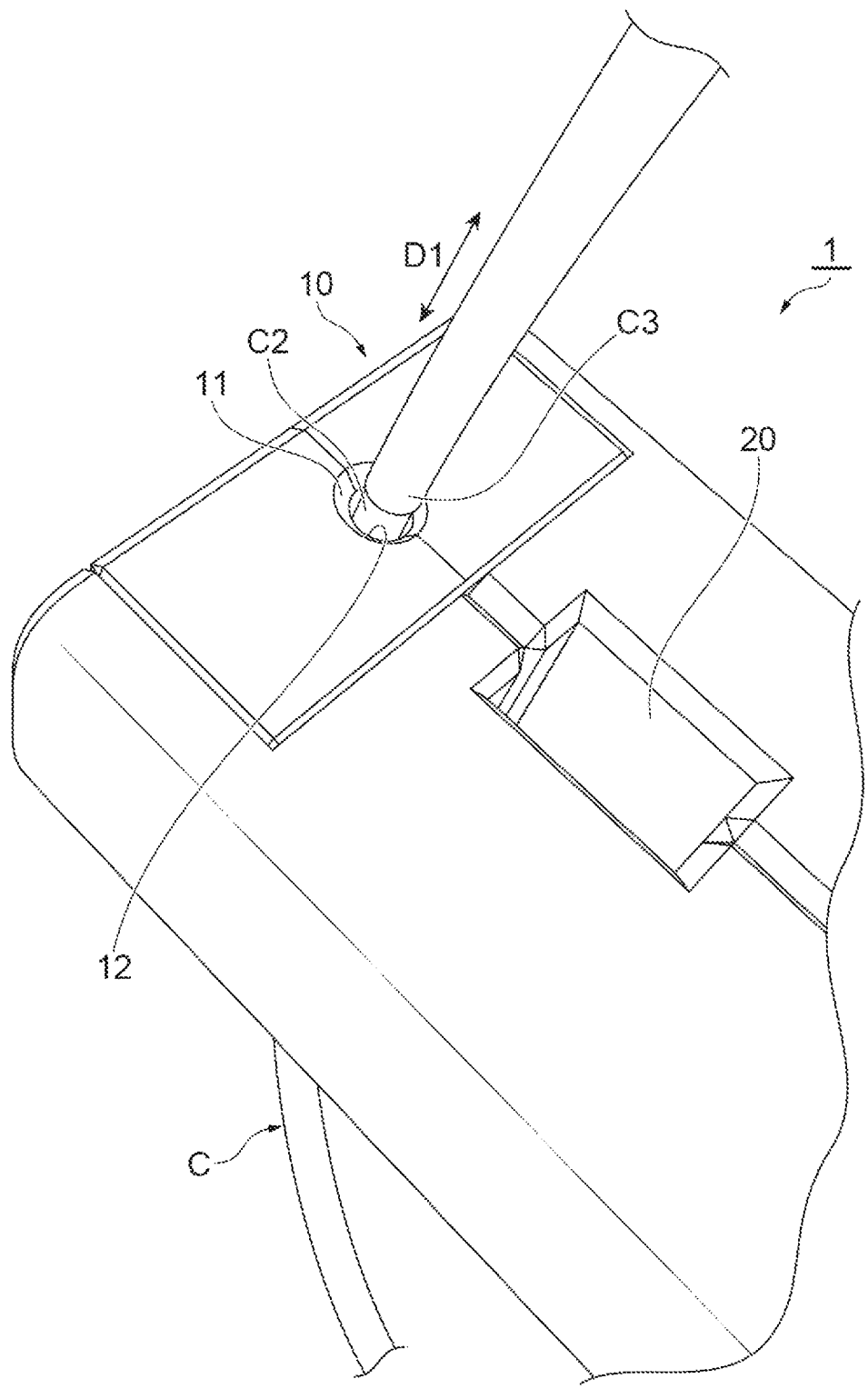
FIG. 7 is a perspective view illustrating a state where the cable is passed through a hole of the cable stripping portion in FIG. 3.
Figure 8:
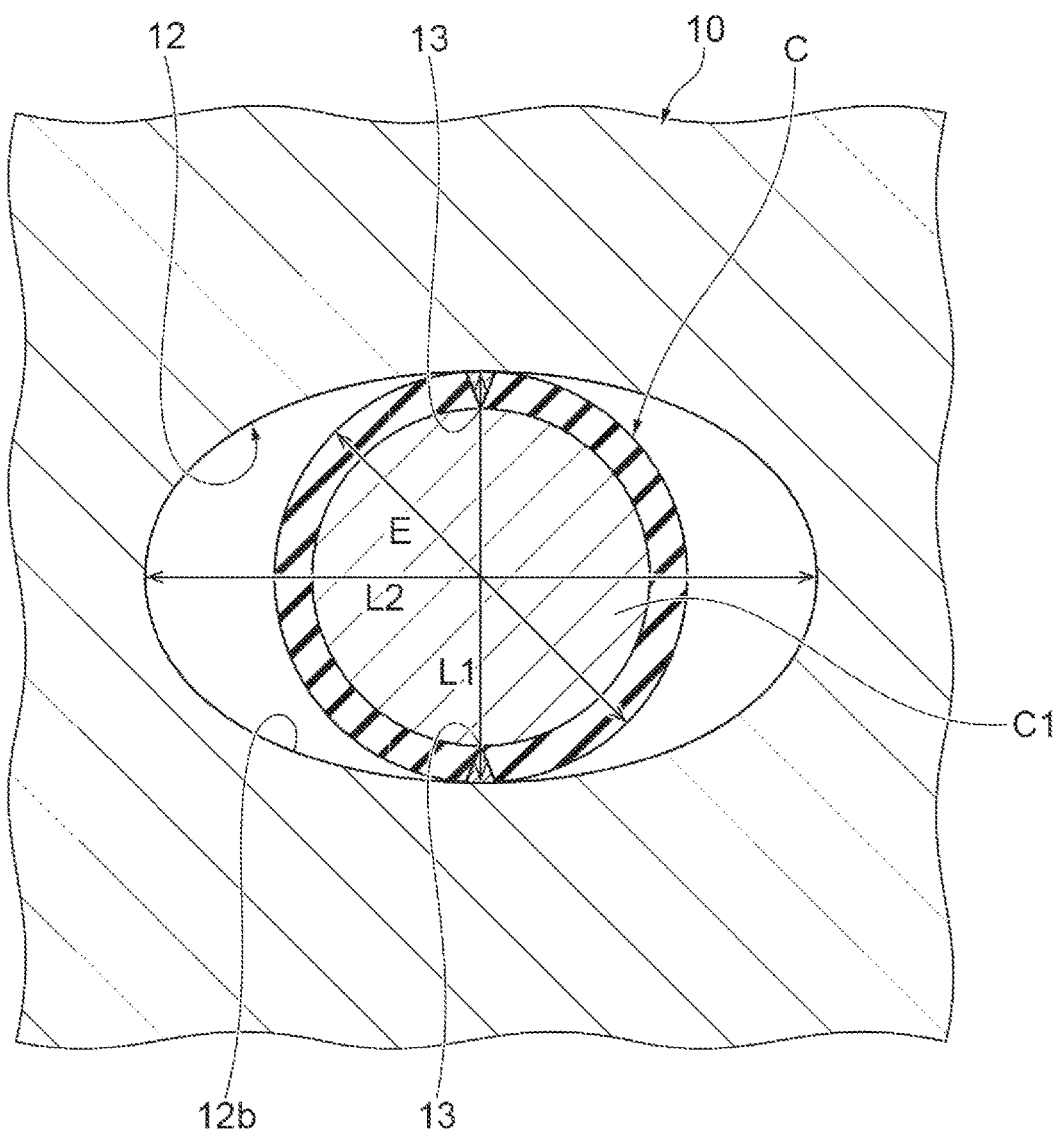
FIG. 8 is a cross-sectional view illustrating the cable passed through the hole in FIG. 7, the hole, and the blade.

FIG. 7 is a perspective view illustrating the cable stripping portion 10 and the cable C inserted into the hole 12 of the cable stripping portion 10. FIG. 8 is a cross-sectional view of the hole 12 and the cable C taken along a plane orthogonal to the extending direction (direction D1) of the cable C. As illustrated in FIGS. 7 and 8, for example, a shape of a cross section of the cable C (hereinafter, may be simply referred to as a "cross section of the cable C") taken along a plane orthogonal to the direction D1 is a substantially perfect circle.

A shape of a cross section of the hole 12 (hereinafter, may be simply referred to as a "cross section of the hole 12") taken along a plane orthogonal to the direction D1 is a non-circular shape. For example, the shape of the cross section of the hole 12 is a shape of an ellipse. A length of a minor axis L1 of the cross section of the hole 12 is substantially the same as, for example, a diameter E of the cable C. A length of a major axis L2 of the cross section of the hole 12 is longer than the diameter E of the cable C. The pair of blades 13 protrude to the inside of the hole 12 along the minor axis L1 of the ellipse at the cross section of the hole 12. The blade 13 protrudes from an end portion of the ellipse in the minor axis L1 to the inside of the hole 12. The blade 13 protrudes toward the inside of the hole (center of the hole) from an inner surface portion of the hole which has a minimum distance from the center of the hole in the cross-sectional shape of the hole 12.

By the way, for example, a portion C3 of an increased diameter such as a portion around which a seal with a barcode is wound may exist in the cable C. Consequently, if a cross-sectional shape of the hole is a perfect circle, it may occur that the portion C3 of an increased diameter in the cable C does not pass through the hole. In the cable stripping tool 1 according to the present embodiment, the shape of the cross section of the hole 12 is a non-circular shape, so that the portion C3 of an increased diameter in the cable C can pass through the hole 12.

Figure 9:
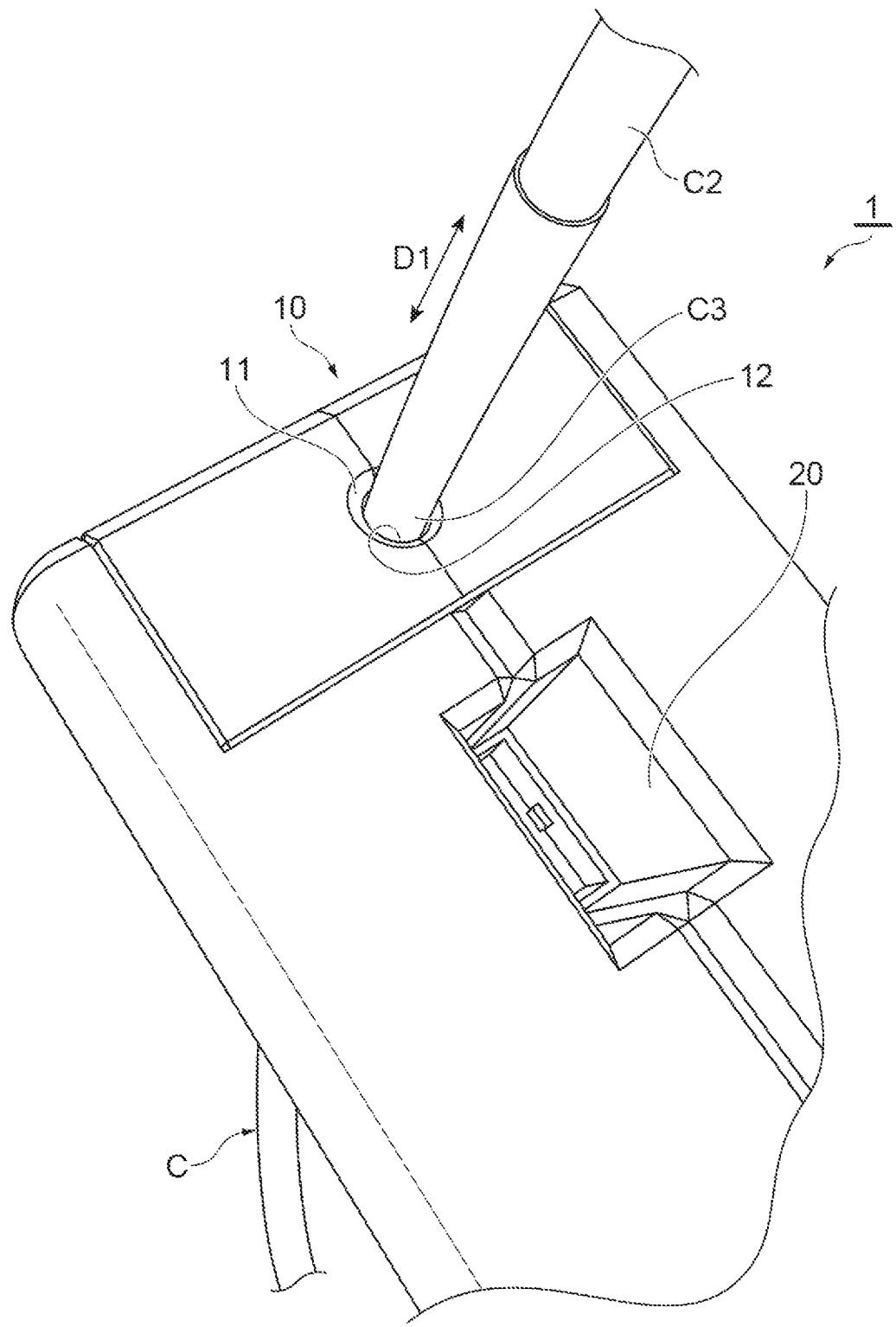
FIG. 9 is a perspective view illustrating a state where a portion of an increased diameter in the cable is passed through the hole of the cable stripping portion in FIG. 3.
Figure 10:
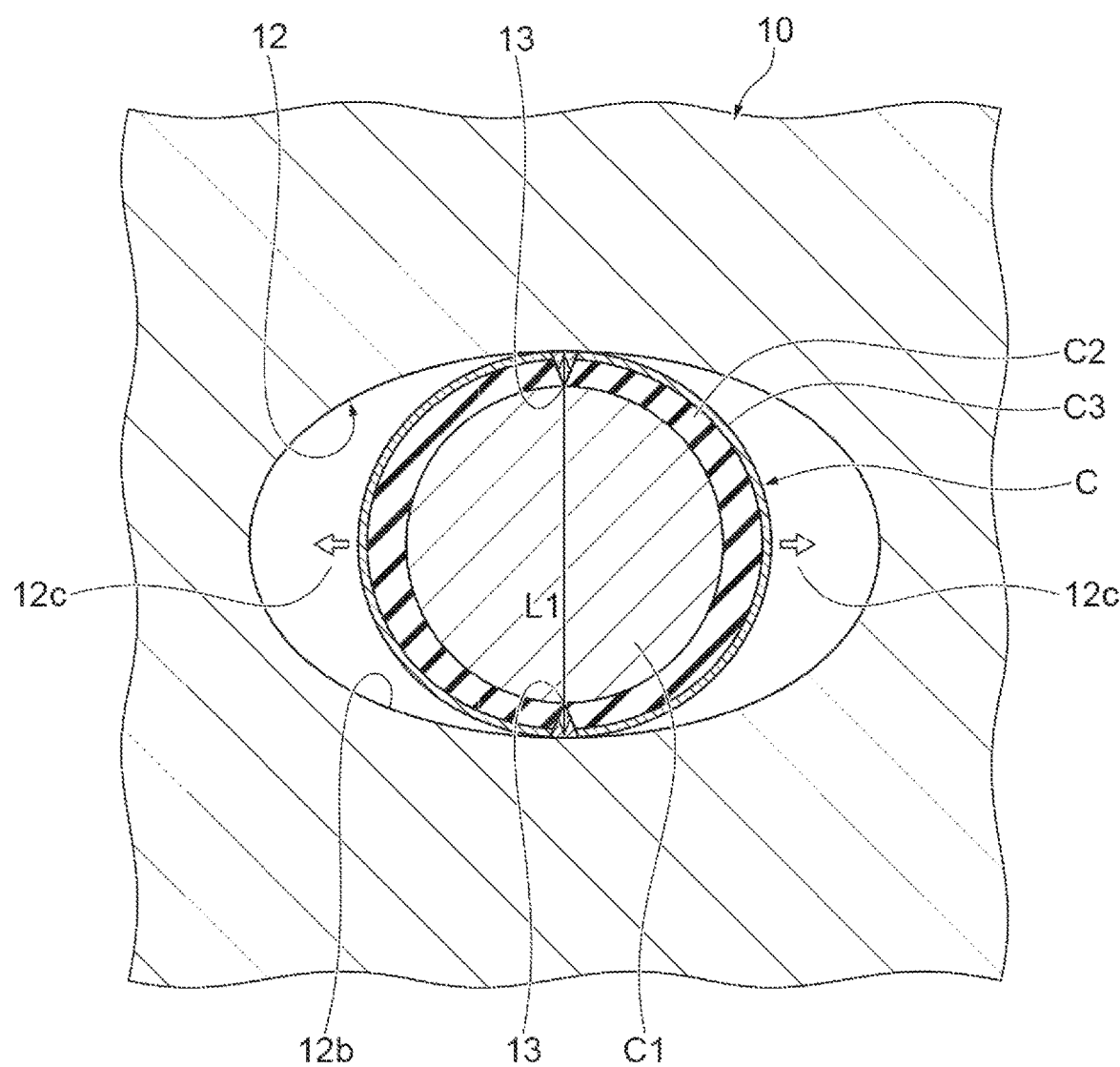
FIG. 10 is a cross-sectional view illustrating the cable passed through the hole in FIG. 9, the hole, and the blade.

FIG. 9 is a perspective view illustrating the cable stripping portion 10 and a state where the portion C3 of an increased diameter in the cable C is inserted into the hole 12. FIG. 10 is a cross-sectional view of the hole 12 and the portion C3 of an increased diameter in the cable C taken along a plane orthogonal to the extending direction (direction D1) of the cable C. As illustrated in FIGS. 9 and 10, a diameter of the portion C3 of an increased diameter in the cable C is longer than the length of the minor axis L1 of the cross section of the hole 12. However, since the portion C3 of an increased diameter in the cable C is inserted into the hole 12 while being pressed against the inclined surface 11, the portion C3 of an increased diameter is pressed in a minor axis direction (up-down direction in FIG. 10) of the cross section of the hole 12. In this state, the portion C3 of an increased diameter in the cable C is deformed outward from the center of the hole in a major axis direction of the cross section of the hole 12. The hole 12 includes space portions 12c that deformed portions of the cable C enter, in the major axis direction (left-right direction in FIG. 10) of the cross section of the hole 12. Since the portions of the cable C that are deformed in the major axis direction of the cross section of the hole 12 by pressing in the minor axis direction of the cross section enter the space portions 12c, the portion C3 of an increased diameter can be smoothly inserted into the hole 12. Therefore, the portion C3 of an increased diameter in the cable C can be smoothly cut by the blades 13 protruding to the inside of the hole 12, together with the sheath C2, so that longitudinal peeling of the cable C can be efficiently performed.

Next, actions and effects obtained from the cable stripping tool 1 according to the present embodiment will be described in detail. In the cable stripping tool 1, the blades 13 that strip the sheath C2 of the cable C protrude from the inner surface 12b of the hole 12 into which the cable C is to be inserted. When the cable C inserted into the hole 12 is pulled out from the hole 12 along the extending direction (direction D1) of the cable C, the blades 13 protruding from the inner surface 12b of the hole 12 cut the sheath C2 of the cable C along the extending direction. Therefore, the sheath C2 of the cable C can be cut along the extending direction of the cable C.

The cross-sectional shape of the hole 12 when the hole 12 is taken along a plane orthogonal to the extending direction of the cable C is a non-circular shape. The hole 12 having a non-circular shape includes the space portions 12c that deformed portions of the cable C inserted into the hole 12 enter. Therefore, when the portion C3 of an increased diameter in the cable C is passed through the hole 12 and the cable C is pressed against the inner surface 12b of the hole 12, the deformed portions of the cable C can enter the space portions 12c. Consequently, even when the portion C3 of an increased diameter in the cable C is passed through and pressed in the hole 12, the deformed portions created by the pressing can escape to the space portions 12c, so that the portion C3 of an increased diameter in the cable C can be prevented from being caught, to allow the portions to smoothly pass through the hole 12. As a result, the portion C3 of an increased diameter in the cable C can be efficiently stripped, together with the sheath C2.

The inclined surface 11 that is inclined to be gradually reduced in diameter toward the hole 12 may be formed in an end portion of the hole 12 in the extending direction. In this case, the inclined surface 11 is formed at one end of the hole 12. Therefore, the portion C3 of an increased diameter in the cable C can be smoothly inserted into the hole 12 via the inclined surface 11, so that the portion C3 of an increased diameter in the cable C can be efficiently stripped by the blades 13.

The cross-sectional shape of the hole 12 taken along a plane orthogonal to the extending direction of the cable C may be an elliptical shape. In this case, the cross-sectional shape of the hole 12 through which the portion C3 of an increased diameter in the cable C is passed can be made simpler.

The blades 13 may protrude to the inside of the hole from inner surface portions of the hole, of which each has a minimum distance from the center of the hole in the cross-sectional shape of the hole 12. In this case, since the blades 13 protrude from the inner surface portions of the hole which press the portion C3 of an increased diameter in the cable C, the blades 13 can easily bite into the pressed portion of the cable C. Therefore, the sheath C2 can be more efficiently stripped by the blades 13.

The connector K may be attached to one end of the cable C via the boot K2. The cable stripping tool 1 may further include the connector disassembling portion 20 that removes the connector K from the cable C, and the boot disassembling portion 30 that disassembles the boot K2. In this case, the sheath C2 can be stripped, the connector K can be disassembled, and the boot K2 can be additionally disassembled by one cable stripping tool 1. Therefore, the stripping of the sheath C2, and the removal of the connector K and of the boot K2 can be performed by one tool, so that work of disassembling the cable C can be efficiently performed.

The embodiment of the cable stripping tool according to the present disclosure has been described above. However, the present invention is not limited to the above-described embodiment. It is easily understood by those skilled in the art that the present invention can be modified and changed in various forms without departing from the concept disclosed in the claims. For example, the shapes, the sizes, the number, the materials, and the disposition mode of portions of the cable stripping tool can be appropriately changed without departing from the concept.

For example, in the above-described embodiment, the cable stripping tool 1 made of metal has been described. However, the cable stripping tool may be made of resin, and the material of the cable stripping tool is particularly limited. In the above-described embodiment, the example has been described in which the inclined surface 11 is formed in the end portion of the hole 12. However, the inclined surface may not be formed. In this case, the portion C3 of an increased diameter in the cable C can be inserted into the hole 12 by pressing and inserting the portion C3 of an increased diameter in the cable C into the hole 12 with fingers or the like.

In the above-described embodiment, the blade 13 and the holding portion 14 each having a parallelogram shape have been provided as an example. However, the shape of the blade and the holding portion can be appropriately changed. In the above-described embodiment, the cable stripping tool 1 including the cable stripping portion 10, the connector disassembling portion 20, and the boot disassembling portion 30 has been described. However, the cable stripping tool may not include both the connector disassembling portion 20 and the boot disassembling portion 30. In the above-described embodiment, the case has been described in which the shape of the cross section of the hole 12 is an elliptical shape. However, the shape of the cross section of the hole into which the cable C is to be inserted may be, for example, a shape such as an oval shape or a rectangular shape other than an elliptical shape.

What is claimed is:

1. A cable stripping tool that strips a sheath of a cable, the tool comprising:
a cable stripping portion including,
a holding portion,
an inclined surface that is gradually and uniformly reduced in diameter toward the holding portion, is formed in an insertion portion into which a cable is to be inserted;
a hole extending from the inclined surface, the hole is configured to receive the cable, the hole having an insertion portion and an end portion, the end portion partially defining the holding portion, the hole extending from the insertion portion to the end portion with a substantially constant cross-section which defines an extension direction of the cable; and
a blade protruding from an inner surface of the hole being held by the holding portion, wherein:
the sheath of the cable inserted into the hole is configured to be cut by the blade when the cable is pulled out from the hole along the extending direction of the cable, and
wherein a cross-sectional shape of the hole is a non-circular shape in a plane orthogonal to the extending direction such that the hole includes a space portion configured to receive a deformed portion of the cable.

2. The cable stripping tool according claim 1, wherein the cross-sectional shape of the hole is an elliptical shape in the plane orthogonal to the extending direction.

3. The cable stripping tool according to claim 1, wherein the blade protrudes to an inside of the hole from an inner surface portion of the hole which has a minimum distance from a center of the hole in the cross-sectional shape of the hole.

4. The cable stripping tool according to claim 1, wherein a connector is attached to one end of the cable, and the cable stripping tool further comprises a connector disassembling portion that removes the connector from the cable.

5. The cable stripping tool according to claim 4, wherein the connector is an MPO connector, and wherein the connector disassembling portion removes the MPO connector from the cable.

6. The cable stripping tool according to claim 1, wherein a connector is attached to one end of the cable via a boot, and the cable stripping tool further comprises a boot disassembling portion that disassembles the boot.

7. The cable stripping tool according to claim 1, wherein the cable stripping tool is made of an aluminum alloy.

8. The cable stripping tool according to claim 1, wherein a first extending portion, a second extending portion, a hinge portion that oscillatably connects the first extending portion and the second extending portion are provided, and the cable stripping portion is provided between the first extending portion and the second extending portion.

9. The cable stripping tool according to claim 8, wherein a connector is attached to one end of the cable, the cable stripping tool further comprises a connector disassembling portion that removes the connector from the cable, and the connector disassembling portion is provided between the first extending portion and the second extending portion.

10. The cable stripping tool according to claim 8, wherein a connector is attached to one end of the cable via a boot, the cable stripping tool further comprises a boot disassembling portion that disassembles the boot, and the boot disassembling portion is provided between the first extending portion and the second extending portion.

11. The cable stripping tool according to claim 1, wherein the inclined surface is formed by C chamfering.

12. The cable stripping tool according to claim 1, wherein the blade has an inclined surface that is inclined with respect to an extending direction of the hole, and the cable inserted into the hole enters the inclined surface.

13. The cable stripping tool according to claim 1, wherein the blade is fittable into the holding portion.

14. The cable stripping tool according to claim 1, wherein the blade has a parallelogram shape.

15. The cable stripping tool according to claim 1, wherein the cable stripping portion includes a pair of the blades, and the hole is formed between the pair of blades.

16. The cable stripping tool according to claim 15, wherein a shape of a cross section of the hole is a shape of an ellipse, and the pair of blades protrudes to an inside of the hole along a minor axis of the ellipse.

17. The cable stripping tool according to claim 1, wherein an entirety of the inner surface of the hole is rounded such that the cross-section of the hole is curved along an entire diameter.

18. The cable stripping tool according to claim 1, wherein the space portion is provided in a major axis direction of the cross-section of the hole, and wherein the inclined portion is provided in a manner such that the inclined surface is configured to press against the cable, upon insertion of the cable, in a minor axis direction of the cross-section of the hole.

* * * * *